United States Patent [19]

Citrin et al.

[11] 4,030,640

[45] June 21, 1977

[54] METHOD AND APPARATUS FOR DISPENSING VISCOUS MATERIALS

[75] Inventors: Paul S. Citrin, Danbury; Frank Gurski, Brookfield, both of Conn.

[73] Assignee: Indicon Inc., Danbury, Conn.

[22] Filed: Nov. 10, 1975

[21] Appl. No.: 630,278

[52] U.S. Cl. .............................. 222/207; 222/209; 222/214; 222/420; 222/262; 222/504; 141/117

[51] Int. Cl.² ........................................ B65D 37/00

[58] Field of Search .......... 222/206, 207, 209, 212, 222/214, 215, 252, 256, 262, 263, 389, 399, 400.5, 420, 504, 505; 141/116, 117

[56] References Cited

UNITED STATES PATENTS

| | | | |
|---|---|---|---|
| 2,884,165 | 4/1959 | Moeller | 222/212 |
| 3,208,643 | 9/1965 | Phillips | 222/389 X |
| 3,369,717 | 2/1968 | Campbell | 222/399 |
| 3,434,632 | 3/1969 | Batrow | 222/400.5 |

Primary Examiner—Robert B. Reeves
Assistant Examiner—Joseph J. Rolla
Attorney, Agent, or Firm—St. Onge, Mayers, Steward & Reens

[57] ABSTRACT

A method and apparatus for dispensing small quantities of viscous materials in a reliable and accurately repeatable manner are described. A deformable tube which couples material in a reservoir to a discharge port is pinched by a valve at the same time the reservoir is pressurized. The material is dispensed in correspondence with the amount of reduction of the tube volume by the pinch valve. A simultaneous depressurizing of the material in the reservoir and the opening of the pinch valve enables a suck-back for a crisp cut-off of the material.

13 Claims, 3 Drawing Figures

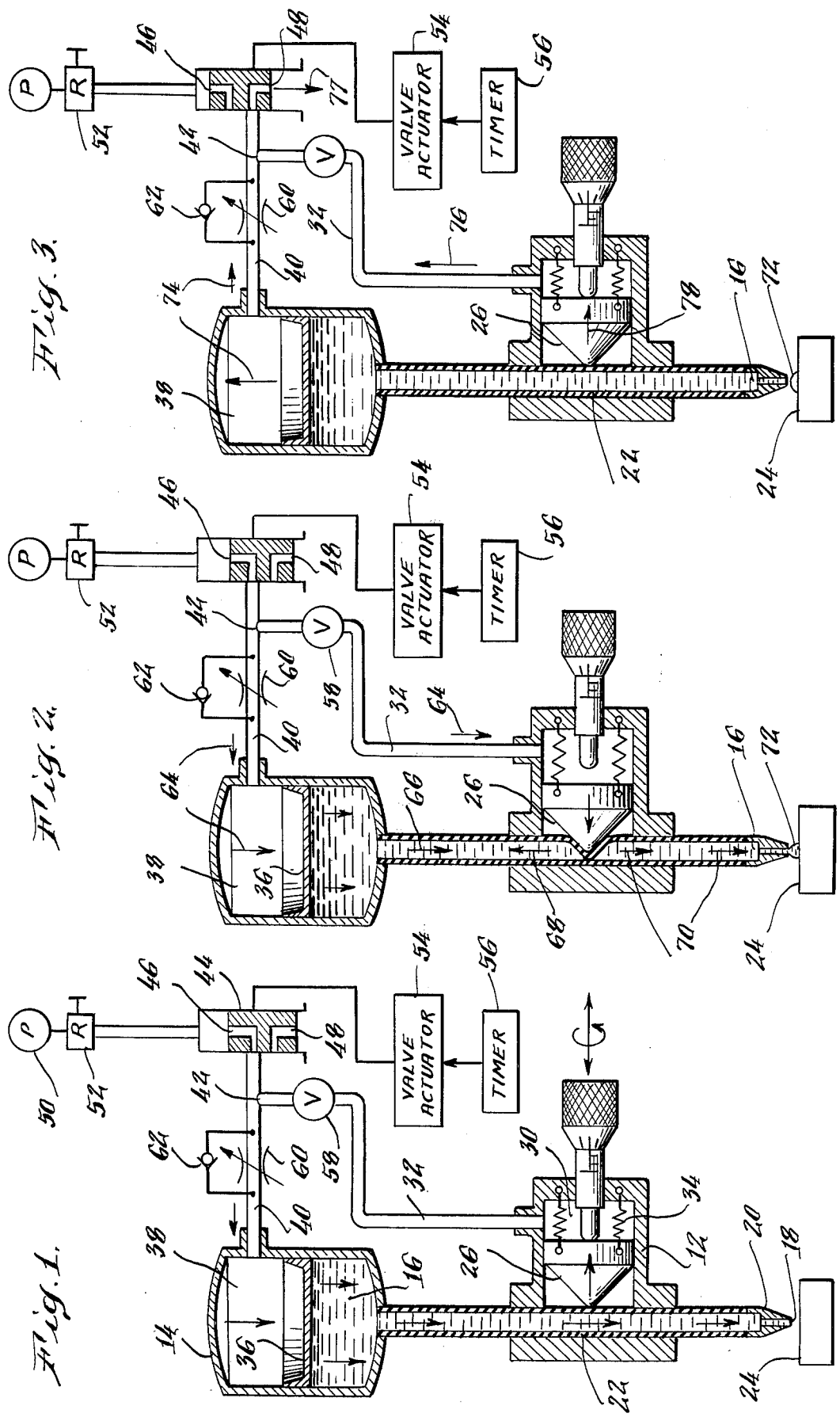

METHOD AND APPARATUS FOR DISPENSING VISCOUS MATERIALS

FIELD OF THE INVENTION

This invention relates to an improved method and apparatus for accurately dispensing a high viscosity material.

BACKGROUND OF THE INVENTION

Dispensers for liquid material are well known in the art. Such dispensers may be of the piston type whereby a piston is advanced along a cylinder reservoir to dispense material. Syringe type reservoirs with needle-shaped dispenser tips frequently employ a piston to discharge material. In other types of dispensers a deformable tube may be employed with a pinch valve to control the dispensation of material. Such dispenser may be as described in a copending patent application entitled "Deformable Tube Material Dispenser" by Paul S. Citrin, the same inventor as of this invention, and filed on Apr. 14, 1975 with Ser. No. 568,123, now U.S. Pat. No. 3,982,724.

In the dispensation of highly viscous materials such as solder pastes, adhesives, greases and the like, a need exists to be able to discharge small amounts in an accurate and reliably repetetive manner. For example, a common problem encountered with piston driven dispensers involves the reliable dispensation of small quantities whose separation from the main stream in the dispenser is difficult to control. When dispenser parts are exposed the abrasiveness of some of the materials quickly wears out these mechanical components. The dispenser's resistance to material flow frequently makes it difficult to control the dispensation of precise quantities and may accelerate viscous material compacting problems when forced through valves and other tortuous paths to a discharge port.

Frequently material characteristics inhibit crisp cut-off of the dispense cycle and make clean-up procedures extremely difficult, particularly when the viscous material has a limited pot life and thus must be dispensed expeditiously. Other materials exhibit a tackiness or stringing tendency, thus making a crisp cut-off difficult to achieve. Such problems in the dispensation of viscous materials effectively inhibit their uses in many areas and deny to potential users the benefits these materials offer.

SUMMARY OF THE INVENTION

In a method and apparatus for dispensing viscous materials, a technique is employed whereby as described in a preferred embodiment a deformable tube is used with a normally open pinch valve to control the discharge of the highly viscous material stored in a reservoir. The material in the reservoir is pressurized at the same time the pinch valve is closed so that the pressurized material in the reservoir is checked against a material back-flow due to the action of the pinch valve. Thereupon, the pressurization of the reservoir material is reduced at the same time the pinch valve is opened. The opening of the pinch valve is accompanied with the resumption of the normal shape of the deformable tube to enable a suck-back of material at the discharge port for a crisp cut-off of the dispensed viscous material.

In a pneumatic apparatus for practicing the method of this invention, the pinch valve and the reservoir are simultaneously pneumatically actuated through suitable conduits coupled thereto and a control valve. The latter enables a simultaneous pressurization of the conduit from a source of pressurized gas as well as a simultaneous discharge to atmosphere. In this manner the material in the reservoir can be pressurized to act as a check valve as the pinch valve is closed and enable a suck-back of the viscous material at the discharge port for a crisp cut-off from the dispensed material when the conduit is exhausted to atmosphere.

With a dispensing method and apparatus in accordance with the invention, a positive precise cut-off action at the completion of a dispense cycle of viscous materials is obtained. The gentle peristaltic action of the pinch valve effectively eliminates compacting and string-type separation of the material while the check valve air pulse supplied to the reservoir eliminates the jamming and wear encountered with conventional mechanical devices.

It is, therefore, an object of the invention to provide a method and apparatus for accurately and reliably dispensing highly viscous materials.

BRIEF DESCRIPTION OF DRAWINGS

These and other advantages and objects of the invention may be understood from the following description of a method and apparatus for practicing the invention and described in conjunction with the drawings in which:

FIGS. 1, 2 and 3 are like schematic representations of a dispenser used in the practice of the invention with the figures respectively demonstrating a sequence of steps.

DETAILED DESCRIPTION OF EMBODIMENT

With reference to FIG. 1 a dispenser 10 is shown with a pinch valve mechanism 12. The dispenser 10 includes a reservoir 14 containing a highly viscous material 16 to be dispensed from a discharge port 18 located in a tip 20. A deformable tube 22 is shown coupling the reservoir 14 to the port 18 to enable material 16 to flow along tube 22 for dispensation on a working surface such as 24.

The pneumatically controlled pinch valve 12 is operatively located between the reservoir 14 and discharge port 18 to close the deformable tube 22 with pneumatically driven pressure element 26.

The pinch valve 12 is normally open, i.e. with the pressure element 26 in the illustrated retracted position for FIG. 1 to provide a straight through flow path between the reservoir 14 and discharge port 18. The pinch valve 12 may be made in accordance with the pinch valve structure as shown and described in the aforementioned copending patent application to Paul S. Citrin. As described in the copending patent application, the pinch valve is pneumatically actuated by pressurizing an inlet port 28 and drive chamber 30 through a supply conduit 32.

Pressurization of chamber 30 drives the pressure element 26 against the tube 22 to pinch it. Exhaust of the gas pressure from conduit 32 enables springs 34 to retract the pressure element 26 and allow the elastic property of the deformable tube 22 to cause a resumption of the tube's natural shape.

The reservoir 14 is provided with a floating piston 36 which separates the material 16 from a gas pressurizable chamber 38 and prevents punch-through effects. A conduit 40 is connected to chamber 38 and coupled in communication with conduit 32 for simultaneous pressurization and exhaust.

The reservoir 14 is shown integrally affixed to deformable tube 22. However, it should be understood that the reservoir may be a separable device with an appropriate nozzle for connection to the pinch valve. Similarly, the tip 20 may be formed and attached as described in the copending patent application.

The conduits 32 and 40 are joined at an intersection 42 and coupled to a schematically illustrated remotely controllable valve 44. Valve 44 has a pair of input ports 46, 48. Port 46 is coupled to a supply of pressurized gas 50 such as is commonly available in manufacturing facilities and which is regulated to a suitable pressure with a regulator 52. Gas port 48 is coupled to atmosphere. Valve 44 is controlled with an actuator 54 which, in turn, is operated by a timer 56. A valve 58 is located in conduit 32 to enable priming of the dispenser as shall be further explained.

A regulator 60 is interposed between the junction 42 and the pressure chamber 18 to control and select the pressure to which the chamber 38 is subjected during operation. Since the pressure chamber 38 is closed, the effect of regulator 60 is obtained with pressure pulses from valve 44 instead of a constant pressure. A check valve 62 is provided to enable a discharge of chamber 38 through valve 44 when no material is to be dispensed.

In the practice of the method of the invention, the reservoir 14 may contain a highly viscous material 16 such as grease, epoxy, solder paste or the like. Whichever material is to be dispensed, an initial priming step is taken as shown in FIG. 1 whereby valve 58 is closed and valve 44 is operated from a normal gas exhaust position to the one as shown for pressurizing conduit 40 and chamber 38.

The pressure in chamber 38 is sufficient to advance piston 36 and drive the material 16 through the tube 22 to discharge port 18.

The pressure in reservoir 14 is then allowed to be exhausted to atmosphere by valve 44 which is operated to the position where port 48 is in communication with conduit 40. The valve 58 is opened and a dispensing operation may be begun with a primed dispenser. The capillary action in tip 18 or the resistance of the conduit in the tip are usually sufficient to retain the material in the primed dispenser without dripping.

As shown for the next step in FIG. 2, valve 44 is operated to enable conduits 32, 42 to be pressurized as suggested by arrows 64. This drives pressure element 26 against the deformable tube 22 with the result of a reduction of its volume both above and below the pinch region.

Since the pressure is simultaneously supplied to the reservoir chamber 38 through regulator 60, the back flow of material 16 above the pinch region is substantially checked as suggested by the opposing arrows 66, 68. Hence, the movement of material 16 away from the pinch region to the reservoir 14 is a negligible amount. The amount or effect of the check can be controlled with an adjustment of the regulator 60 to thus aid in the control of the amount of material being dispensed. The duration of the gas pressure applied from valve 44 is made a function of the time needed to actuate the pinch valve 12. This may be in the order of about a fraction of a second, say about 100 milliseconds. Different time periods may be involved depending upon the size and type of pinch valve, the deformability of the tube and resistance by the high viscosity material.

The material 16 below the pinch region, however, is allowed to flow as a result of the tube volume reduction. The material flow is suggested by arrows 70 and results in a deposit of a small amount 72 on surface 24 depending upon the size of the tube volume reduction caused by the pinch valve 12 and the check pressure developed in chamber 38.

At the end of the simultaneous pressurization cycle for both the reservoir 14 and pinch valve 12, the valve 44 is actuated as shown in FIG. 3 to simultaneously exhaust the reservoir chamber 38 through check valve 62 and conduit 32. The flow of gas is as shown by arrows 74, 76, 77 and the springs 34 cause a retraction of the pressure element 26 as suggested by arrow 78.

The elastic property of tube 22 causes a resumption of its normal shape, thus causing an expansion of its previously reduced volume. This, in turn, sucks back material 16 from both above and below the pinch region. The material being drawn up through discharge port 18 separates from the deposit 72 on surface. The separation occurs in a crisp manner to enable a sharp cut-off.

With a dispensing method as described, many cycles may be repeated in a rapid manner. The deposit 72 is consistent in size to provide a reliable dispensation of even very small amounts without complex cleaning, compaction and reliability problems commonly encountered with viscous materials.

With the apparatus as described, an electrically actuated pinch valve may be employed. Similarly, pressurization of the material 16 in reservoir 14 may be obtained with a mechanical actuator operating on piston 36.

The pinch valve is a preferred actuator for reducing the volume leading to the discharge port 18. However, one can appreciate that other volume reducing devices may be employed. For example, one may use a piston type element which is inserted directly into the fluid stream to cause a volume reduction and increase while the material in the reservoir is respectively pressurized and released. Since such approach exposes more active elements to the material being dispensed, the preferred method and apparatus involves a deformable tube.

Having thus described a method and apparatus for dispensing a viscous material, the advantages of the invention can be appreciated.

What is claimed is:

1. In a high viscosity material dispenser having a discharge port in material flow communication with a deformable tube coupled to receive material from a reservoir from where the high viscosity material is obtained for dispensing with a normally open pinch valve operatively located between the discharge port and the reservior to deform the tube for the discharge of material, the improvement comprising first means for simultaneously pressurizing the material in the reservoir and closing the pinch valve to deform the tube against pressurized material and reduce the volume of the tube for the dispensation of a desired amount of high viscosity material contained in the segment of the tube located between the pinch valve and the discharge port, and second means for simultaneously reducing pressurization of the material in the reservoir and opening the pinch valve to enable the tube to increase its volume for a suck-back of the material at the discharge port and a crisp cut-off from dispensed material.

2. The improved high viscosity material dispenser as claimed in claim 1 wherein said material dispenser has a pneumatically pressurizable reservoir and a pneumatically actuated pinch valve with a source of pressurized gas for dispenser operation and wherein said first means and second means each further includes
a tubing network coupled to simultaneously respectively pressurize and reduce the pressure in the reservoir and to the pinch valve.

3. The improved high viscosity material dispenser as claimed in claim 2 wherein said tubing network is further provided with
a valve located in a segment of the tubing network leading to the pinch valve and to enable pressurization of the reservoir without actuation of the pinch valve for a priming of the dispenser.

4. The improved high viscosity material dispenser as claimed in claim 3 wherein the tubing network is further provided with a multiple position control valve operatively disposed with the source of gas pressure, ambient pressure, the reservoir and the pinch valve to enable simultaneous pressurization thereof in one position of the control valve and simultaneous gas discharge to ambient in another position of the control valve.

5. In a method for dispensing on a surface a high viscosity material stored in a reservoir and dispensed through a conduit with a normally open valve operatively disposed with respect to the conduit to reduce the material volume of the conduit upon closure of the valve for the dispensation of a desirable amount of material from a discharge port of the dispenser comprising the steps of
simultaneously pressurizing the material in the reservoir and actuating to close the valve to reduce the material volume in the conduit and cause the emission of material from the discharge port in correspondence with the reduction of the material volume in the conduit, and followed by the step of
simultaneously reducing pressurization of the material in the reservoir and opening the valve to increase the volume in the conduit to suck back material at the discharge port for separation of the material in the conduit from the desired amount of material dispensed on the surface.

6. The method for dispensing a high viscosity material as claimed in claim 5 and further including the initial step of
pressurizing the material in the reservoir without closing the valve to fill the conduit with the high viscosity material.

7. In a method for dispensing on a surface a high viscosity material stored in a pressurizable reservoir and dispensed through a deformable tube by actuating a normally open pinch valve operatively disposed to pinch the deformable tube for the dispensation of a desirable amount of material from a discharge port of the dispenser, the improvement comprising the steps of
simultaneously pressurizing the material in the reservoir and closing the pinch valve to deform the tube and cause the emission of material from the discharge port in correspondence with the amount of deformation of the tube, and followed by the step of
simultaneously reducing pressure of the material in the reservoir and opening the pinch valve to enable reformation of the tube with a suck-back of material at the discharge port for separation of the material in the tube from the desired amount of material dispensed on the surface.

8. The method for dispensing a high viscosity material as claimed in claim 7 wherin the simultaneous pressurizing and actuating step further includes the steps of
pneumatically pressurizing a floating piston operatively located in the reservoir to check the return flow of material; and
simultaneously pneumatically actuating the pinch valve to dispense the desired amount of material from the discharge port.

9. The method for dispensing a high viscosity material as claimed in claim 8 wherein the simultaneous pressurizing and actuating step is preceded by the step of
pressurizing the material in the reservoir without actuating the pinch valve to initially advance the material to the discharge port.

10. In a high viscosity material dispenser having a discharge port in material flow communication with a conduit coupled to receive material from a reservoir from where the high viscosity material is obtained for passage along the conduit to the discharge port with a normally open conduit volume changer operatively disposed between the reservoir and the discharge port, the improvement comprising
first means for simultaneously pressurizing the material in the reservoir and actuating the volume changer to reduce the volume of the conduit for the dispensation of a desired amount of high viscosity material contained in the conduit and second means for simultaneously reducing pressurization of the material in the reservoir and deactuating the volume changer to increase the volume of the conduit for a suck-back of the material at the discharge port and a crisp cut-off from dispensed material.

11. The improved high viscosity material dispenser as claimed in claim 10 wherein the reservoir includes an effectively gas-sealed pressure chamber to pressurize the high viscosity material, said improvement further including
means for producing a gas pressure pulse to the pressure chamber to establish a check pressure therein having a selectable magnitude; and
means for discharging the check pressure at the end of the gas pressure pulse.

12. The improved high viscosity material dispenser as claimed in claim 11 wherein the means for producing a check pressure of a selectable magnitude is formed with a gas pressure regulator.

13. The improved high viscosity material dispenser as claimed in claim 12 wherein the means for discharging the check gas pressure is formed with a check valve oriented to discharge gas at the end of the gas pressure pulse.

* * * * *